March 18, 1958     J. H. GRAYSON     2,827,534
WALL THERMOSTAT
Filed May 12, 1955
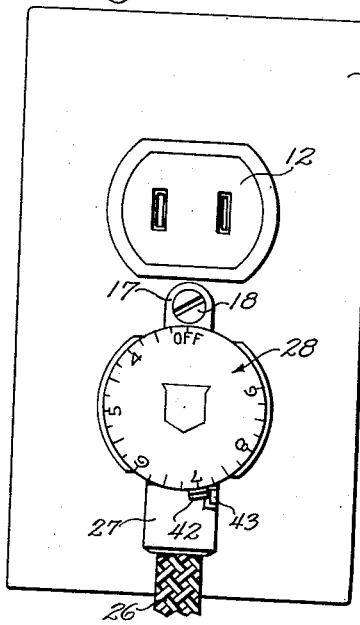
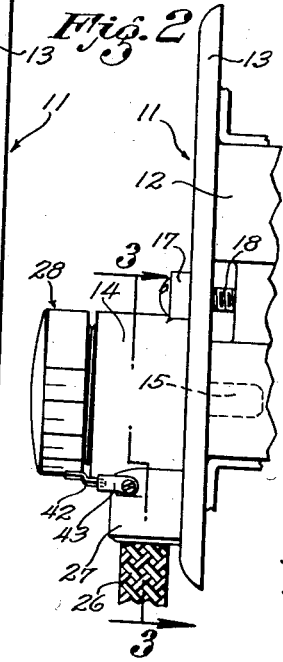
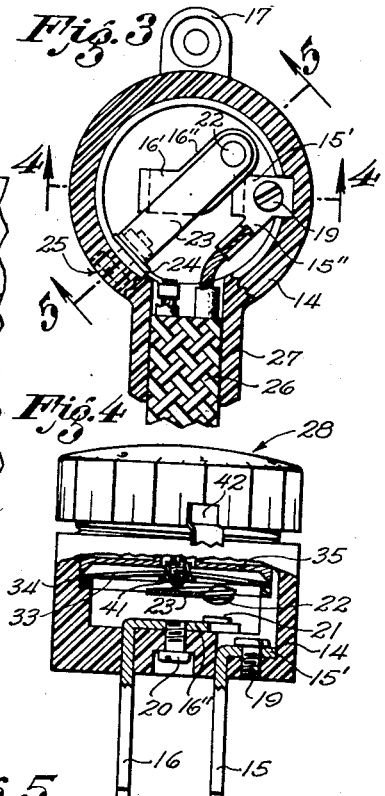
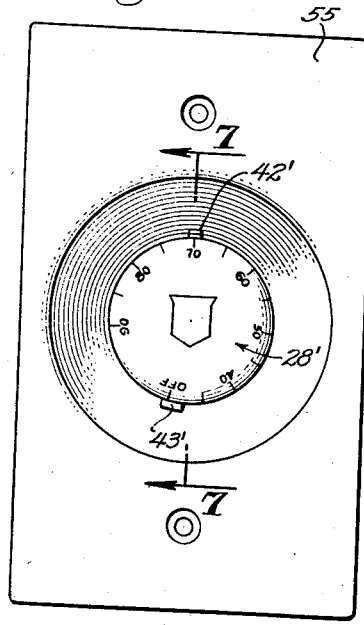
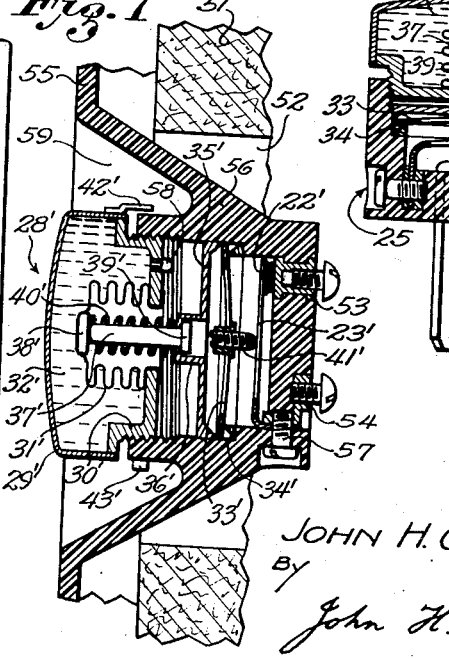
Inventor,
JOHN H. GRAYSON
By
John H. Rouse,
Attorney

United States Patent Office 2,827,534
Patented Mar. 18, 1958

2,827,534

WALL THERMOSTAT

John H. Grayson, Monrovia, Calif., assignor to General Controls Co., Glendale, Calif., a corporation of California Application May 12, 1955, Serial No. 507,910

2 Claims. (Cl. 200—140)

My present invention relates to thermostats, and more particularly to those of the wall-mounted type adapted for controlling the operation of apparatus for heating or cooling a room so as to maintain uniform temperature therein.

An object of this invention is to provide a thermostat wherein the thermally-responsive actuating means is carried by a dial or knob which is rotatable to adjust the temperature setting of the thermostat.

Another object is to provide a thermostat, of the character described in the preceding object, wherein the knob is hollow and the thermally-responsive actuating means is within the hollow of the knob. A more specific object is to arrange the hollow of the knob so that it forms a work chamber containing thermally expansible fluid and has a wall, movable in response to variation of the pressure of the fluid, for actuating the temperature controlling means.

Another object is to provide means for mounting a thermostat, of the general type referred to above, over an opening in the wall of a room so that the thermostat is substantially flush with the wall, and yet circulation of air around the thermally-responsive front part of the thermostat is freely permitted.

Another object is to provide a thermostat having a pair of prongs adapted to be plugged into an ordinary electric wall-outlet, and means for connecting a cable (for supplying electric energy to a remote device) to the prongs in series with switching means actuated by the thermostat.

For full understanding of the invention, and further appreciation of its objects and advantages, reference is to be had to the following detailed description and accompanying drawing, and to the appended claims.

In the drawing:

Figures 1 and 2 are, respectively, a front elevation and a side elevation of a thermostat embodying this invention, shown plugged into an electric wall-outlet fixture;

Figure 3 is an enlarged sectional view of the thermostat of Figs. 1–2 taken mainly immediately in front of contact-blade 23 and along the irregular line 3—3 of Fig. 2;

Figures 4 and 5 are sectional views of the whole thermostat taken along the lines 4—4 and 5—5, respectively, of Fig. 3;

Figure 6 is a front elevation of another form of thermostat according to this invention; and Figure 7 is a fragmentary sectional view, to enlarged scale, taken along the line 7—7 of Fig. 6.

Referring first more particularly to Figs. 1–5 of the drawing, the numeral 11 indicates a wall-outlet fixture comprising an ordinary electric receptacle 12 of the duplex type, and an apertured cover plate 13. On the front of the fixture is a thermostat having a base portion 14 from which projects a pair of prongs 15 and 16 received by the receptacle. The thermostat base has at its top an ear 17 having an opening for a screw 18 whereby the thermostat, together with plate 13, can be fastened to receptacle 12. It is to be understood that the thermostat may be mounted by merely plugging it into a receptacle; however, locking of the thermostat in place by means of screw 18 ensures against accidental dislodgment of the thermostat that might cause breaking of the electric connections.

The base portion 14 of the thermostat is of molded insulating materail and generally cup-shaped. The prongs 15, 16 project through slots in the end wall of the base, their inner portions 15′, 16′ being bent at right-angles and fastened to the end wall by screws 19 and 20. The inner portion 16′ of prong 16 has an angled extension 16″ provided with a contact element 21 cooperable with another contact element 22 carried by one end of a resilient contact blade 23 which is flexed to contact-opening position. The other end of blade 23 is bent and secured to the side wall of the base, together with a terminal lug 24, by a screw and nut arrangement 25. The prong portion 15′ has an extension formed to provide another terminal lug 15″. Secured to lugs 24 and 15″, respectively, are the two wires of an electric cable 26 which projects through an apertured boss 27 formed on the underside of the thermostat base. It is clear from the foregoing that a remote electric device (such as an electric heater, the electric valve of a gas-consuming space-heater, or an electric air-conditioner) connected to cable 26 will be supplied with energy from the wall-outlet fixture under the control of the switching means 21′–23.

The front part of the thermostat is in the form of a hollow knob or dial 28 which, as can be seen in Fig. 5, consists of two metallic cups 29 and 30 sealingly joined at their rims, as by solder. The outside of cup 30 is screw-threaded and cooperates with threads on the inside of base 14 at its outer end. Cup 30 has a central opening through its end wall, around which opening is secured, as by solder, the open end of an expansible-contractible metallic bellows 31. The space within knob 28 defined by cups 29, 30 and the movable wall or bellows 31 is charged with thermally expansible fluid 32, the charge being preferably in the form of a solid fill of suitable liquid.

Inside base 14 adjacent cup 30 is snap-acting mechanism comprising an apertured snap-disk 33 fulcrumed adjacent its periphery on a ring 34 which is triangular in cross-section and abuts a shoulder on the side wall of the base. At the side of snap-disk 33 opposite ring 34 is a disk 35 having a knife-edged annular projection which bears against the snap-disk on a circle larger in diameter than the fulcrum-circle of ring 34.

Disk 35 has at its center a cup-shaped projection 36 having an opening through its end wall for a stem 37 which extends inside bellows 31 and has a head 38 to which the closed end or head of the bellows is secured, as by solder. At its end inside projection 36 the stem is provided with a removable head or nut 39 which is normally maintained in tight engagement with the end wall of the projection by the force of a stiff spring 40 encircling the stem. By this arrangement disk 35 is so connected to the head of bellows 31 that, in normal operation of the thermostat, these parts move as a unit in response to thermal expansion and contraction of the liquid 32, but in the event of abnormal expansion of the liquid the stem can move relative to disk 35 against the force of spring 40. Threaded in a sleeve secured to snap-disk 33 at its center is a screw 41 which is rotatable to adjust the calibration of the thermostat and has an insulating tip engageable with the switch blade 23.

The thermostat is shown in Figs. 1–5 with its parts in the position assumed when dial 28 is rotated in counter-clockwise direction to its "off" setting indicated by the position of that legend in Fig. 1. Since the threaded connection between the dial and the base is a left-hand one, such rotation of the dial effected inward movement of disk 35 and snapping of disk 33 over-center to its position, as shown, wherein screw 41 is out of engagement with switch blade 23 and contacts 21 and 22 separated.

Assuming that cable 26 is connected to electrically operated apparatus for heating a room wherein the thermostat is located and that the temperature of the room is below that desired, to initiate automatic operation of the heating apparatus the dial or knob 28 is rotated in clockwise direction to the desired setting. As disk 35 is retracted by such rotation of the dial a point will be reached at which the disk 33 will snap over-center (downwardly, as viewed in Fig. 5) to normal shape and, by engagement of the tip of screw 41 with blade 23, effect closing of contacts 21, 22 and thereby energization of the heating apparatus. As the temperature of the room then rises, disk 35 will be forced inwardly due to expansion of the liquid in the knob and, through the snap-action mechanism, effect opening of contacts 21, 22 when the desired degree of room temperature is reached.

Since existing wall-outlets are at different heights from the floor, the dial is not graduated in degrees of temperature but is provided with aribitrary numbers, the correct one of which for the particular location of the thermostat can be determined by experiment. Rotation of the dial is limited by a finger 42 fixed to the dial and cooperating with a stop element 43 removably fastened to the base.

The other form of thermostat shown in Figs. 6 and 7 is adapted to be mounted in the usual manner on a wall, indicated at 51 in Fig. 7, so as to cover an opening 52 therein, and has at its back screw-terminals 53 and 54 for connecting wires leading to the apparatus to be controlled.

The base 55 for the thermostat of Figs. 6-7 is generally plate-like and has a central portion 56 which is thickened at its back and recessed at its front to receive the thermostat parts, the main ones of which are identical with those shown and described in connection with the thermostat of Figs. 1-5 and have therefore been assigned the same numerals with a prime mark added. It suffices to mention that the switch blade 23' is fastened by a screw 57 directly to a bent extension of terminal 54 and carries a contact element 22' cooperable with another contact element on the inner end of terminal 53.

It is to be assumed that this thermostat is employed for controlling heating apparatus and that the ambient temperature at dial 28' is lower than the temperature (70°) for which the thermostat is set, so that the snap-switch is shown in closed position in Fig. 7. The numeral 58 indicates the bent-over end of a capillary tube which was sealed-off after the liquid 32' was introduced.

The base-plate recess wherein the thermostat parts are mounted is so deep that the front of dial 28' is substantially flush with the front of the base, the recess being enlarged at its front to provide a V-shaped annular space 59 for circulation of air around the dial and also to receive the tips of one's fingers when the dial is rotated to adjust the temperature setting.

The thermostats shown in the drawing can be converted to control cooling apparatus by merely reversing the switch-actuating snap-disk; however, it is to be understood that the invention is not limited to the use of a switch of the snap-action type. Also, instead of having a threaded connection with the base, as shown, the dial could be rotatably mounted thereon and carry an eccentric cam or finger for adjusting the setting of a switching mechanism. Further, in the thermostat of Figs. 6-7 the temperature controlling means could be in the form of a pilot valve for a pneumatic system instead of a switch for controlling an electric system.

The specific embodiments of my invention herein shown and described are obviously susceptible of still further modification without departing from the spirit of the invention, and I intend therefore to be limited only by the scope of the appended claims.

I claim as my invention:

1. In a wall thermostat: a plate-like base member adapted to be mounted on a wall so as to cover an opening therein, said base member having at its back a thickened portion adapted to project into said wall-opening, and having in its front surface a recess extending into said back portion; a thermostat mounted in said recess; said recess being open at its front so that said thermostat is exposed and deep enough to receive substantially all of the thermostat; and thermostatic means in the outer portion of the thermostat responsive to the ambient temperaure thereat; said recess being enlarged at its front to permit free circulation of air around said outer portion of the thermostat.

2. A thermostat according to claim 1 wherein said outer portion of the thermostat is knob-like and rotatable relative to the remainder of the thermostat to adjust the control setting of the thermosat, and said recess is enlarged sufficiently at its front to permit gripping of said knob-like portion by the tips of a person's fingers.

References Cited in the file of this patent
UNITED STATES PATENTS

| | | |
|---|---|---|
| 2,273,375 | Ray | Feb. 17, 1942 |
| 2,288,517 | Dubilier | June 30, 1942 |
| 2,289,882 | Myers | July 14, 1942 |
| 2,308,911 | Campodonico | Jan. 19, 1943 |
| 2,399,406 | Toth | Apr. 30, 1946 |
| 2,493,190 | Fuchs | Jan. 3, 1950 |
| 2,739,204 | Garner et al. | Mar. 20, 1956 |